(12) United States Patent
Wang et al.

(10) Patent No.: US 11,774,628 B2
(45) Date of Patent: Oct. 3, 2023

(54) PROBABILISTICALLY DISTINGUISHING BETWEEN TRUE AND FALSE SCINTILLATOR PULSES

(71) Applicant: Halliburton Energy Services, Inc., Houston, TX (US)

(72) Inventors: Jiaxin Wang, Katy, TX (US); Lei Wang, Burlingame, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 849 days.

(21) Appl. No.: 16/754,274

(22) PCT Filed: May 24, 2019

(86) PCT No.: PCT/US2019/034011
§ 371 (c)(1),
(2) Date: Apr. 7, 2020

(87) PCT Pub. No.: WO2020/242442
PCT Pub. Date: Dec. 3, 2020

(65) Prior Publication Data
US 2021/0341639 A1 Nov. 4, 2021

(51) Int. Cl.
*G01V 5/04* (2006.01)
*E21B 44/00* (2006.01)
*E21B 49/00* (2006.01)

(52) U.S. Cl.
CPC .............. *G01V 5/045* (2013.01); *E21B 44/00* (2013.01); *E21B 49/00* (2013.01)

(58) Field of Classification Search
CPC .......... G01V 5/045; G01V 5/04; E21B 44/00; E21B 49/00; E21B 2200/20
See application file for complete search history.

(56) References Cited

U.S. PATENT DOCUMENTS 5,483,061 A 1/1996 Sloan
5,744,803 A 4/1998 Grodsinsky et al.
(Continued)

FOREIGN PATENT DOCUMENTS

EP 0786674 A2 7/1997
WO 2014180734 A2 11/2014
WO 2014201429 A1 12/2014

OTHER PUBLICATIONS

Foreign communication from the priority International Application No. PCT/US2019/034011, International Search Report and Written Opinion, dated Feb. 21, 2020, 13 pages.

(Continued)

*Primary Examiner* — John E Breene
*Assistant Examiner* — Yaritza H Perez Bermudez
(74) *Attorney, Agent, or Firm* — Conley Rose, P.C.; Rodney B. Carroll (57) ABSTRACT

In some examples, a computer-readable medium stores executable code which, when executed by a processor, causes the processor to obtain a threshold pulse rate that is based on an average pulse rate of a gamma radiation detector tool and on a desired probability that the threshold pulse rate will not be exceeded by the gamma radiation detector tool. The code also causes the processor to identify instances of pulse from the gamma radiation detector tool that do not exceed the threshold pulse rate, and output an indication of the identified instances of pulses for use in a measurement-while-drilling application.

20 Claims, 7 Drawing Sheets

(56) References Cited

U.S. PATENT DOCUMENTS

| | | | |
|---|---|---|---|
| 5,869,836 | A | 2/1999 | Linden et al. |
| 8,492,705 | B2 | 7/2013 | Menge et al. |
| 8,646,519 | B2 | 2/2014 | Johanning et al. |
| 8,803,076 | B1 * | 8/2014 | Miller .................. G01V 5/12 |
| | | | 250/261 |
| 8,907,289 | B2 | 12/2014 | Wraight |
| 9,069,095 | B1 | 6/2015 | Beekman et al. |
| 9,500,765 | B2 | 11/2016 | Duraj et al. |
| 9,746,582 | B1 | 8/2017 | Zhou |
| 9,880,295 | B2 | 1/2018 | Stephenson et al. |
| 2003/0138067 | A1 * | 7/2003 | Tiller .................. G01V 5/101 |
| | | | 376/160 |
| 2004/0036025 | A1 | 2/2004 | Wong et al. |
| 2007/0034808 | A1 | 2/2007 | Evans |
| 2009/0150077 | A1 * | 6/2009 | Stoller .................. G01V 5/12 |
| | | | 250/269.1 |
| 2017/0322340 | A1 * | 11/2017 | Zhou .................. G01V 5/101 |
| 2018/0017709 | A1 | 1/2018 | Galford et al. |

OTHER PUBLICATIONS

Acknowledgement receipt and specification for International application entitled "Probabilistically Distinguishing Between True and False Scintillator Pulses," by Jiaxin Wang, et al., filed May 24, 2019 as International application No. PCT/US2019/034011, 37 pages.
Kimmich, K., et al., "Characterizing, Simulating, and Eliminating Vibration Induced Counts in Measurement While Drilling Gamma Ray Detectors," 9 pages, Bicron.

* cited by examiner

PROBABILISTICALLY DISTINGUISHING BETWEEN TRUE AND FALSE SCINTILLATOR PULSES

CROSS-REFERENCE TO RELATED APPLICATIONS

This application is a filing under 35 U.S.C. 371 of International Application No. PCT/US2019/034011 filed May 24, 2019, entitled "Probabilistically Distinguishing between True and False Scintillator Pulses," which application is incorporated by reference herein in its entirety.

BACKGROUND

Boreholes are drilled in geological formations to extract hydrocarbons from those formations. Formations may contain various types of rock and sediment, each of which naturally produces gamma radiation in a quantity that depends on the concentration of radioisotopes found in that type of rock or sediment. Gamma radiation signatures are therefore useful in distinguishing different formation layers from each other. This information can be useful in making exploration decisions.

Gamma radiation detectors are tools that are useful in detecting and interpreting gamma radiation signatures. Typically, such tools are deployed in drill strings to identify various formation layers during drilling. Such information can be used in, e.g., geosteering applications. Commonly, gamma radiation detectors include scintillation crystals that emit pulses of light (photons) in response to the detection of gamma radiation. The detectors also include photomultiplier tubes (PMTs) that convert the pulses of light into electrical signals. These electrical signals can then be processed to determine information regarding the formation surrounding the borehole.

BRIEF DESCRIPTION OF THE DRAWINGS

For a detailed description of various examples, reference will now be made to the accompanying drawings in which.

DETAILED DESCRIPTION

Environmental conditions can cause gamma radiation detectors to malfunction. For example, drilling-induced vibration can cause scintillation crystals to emit "false" pulses that are difficult to distinguish from "true" pulses, which are generated in response to gamma radiation. Other mechanical forces, such as ripping, scratching, crushing, and rubbing, can similarly cause false pulses to be emitted. This phenomenon, called triboluminescence, represents a significant challenge in gamma radiation detection in the drilling arts. Various other drilling conditions also may cause false pulses to be generated, for example, by negatively impacting electrical circuits used in gamma radiation detector tools.

Described herein are various examples of an improved gamma radiation detector tool (GRDT) for accurately distinguishing between true and false pulses generated by a scintillation crystal and associated electrical circuits. The GRDT described in this disclosure distinguishes between true and false pulses by performing a probabilistic analysis to determine a threshold pulse rate. The threshold pulse rate is set such that any pulse rate exceeding the threshold pulse rate is highly likely to contain one or more false pulses, and any pulse rate not exceeding the threshold pulse rate is highly likely to contain only true pulses. In some examples, the GRDT determines the threshold pulse rate using the Poisson equation, as is explained below. After determining the threshold pulse rate, the GRDT categorizes each instance of incoming pulses as true or false, depending on whether that instance of pulses exceeds or does not exceed the threshold pulse rate. False pulses are discarded or used for other purposes, and true pulses are recorded. The recorded pulses can then be used in any of a variety of practical technical applications, such as steering of a drill string containing the GRDT.

The GRDT disclosed herein confers multiple technical advantages. For example, by providing more accurate data regarding the composition of the formation adjacent the borehole being drilled, the GRDT enables more accurate geosteering, more efficient hydrocarbon production, reduced wear and tear on drilling equipment, and reduced drilling downtime. Various examples of the structure and operation of the GRDT are now described.

Figure 1:
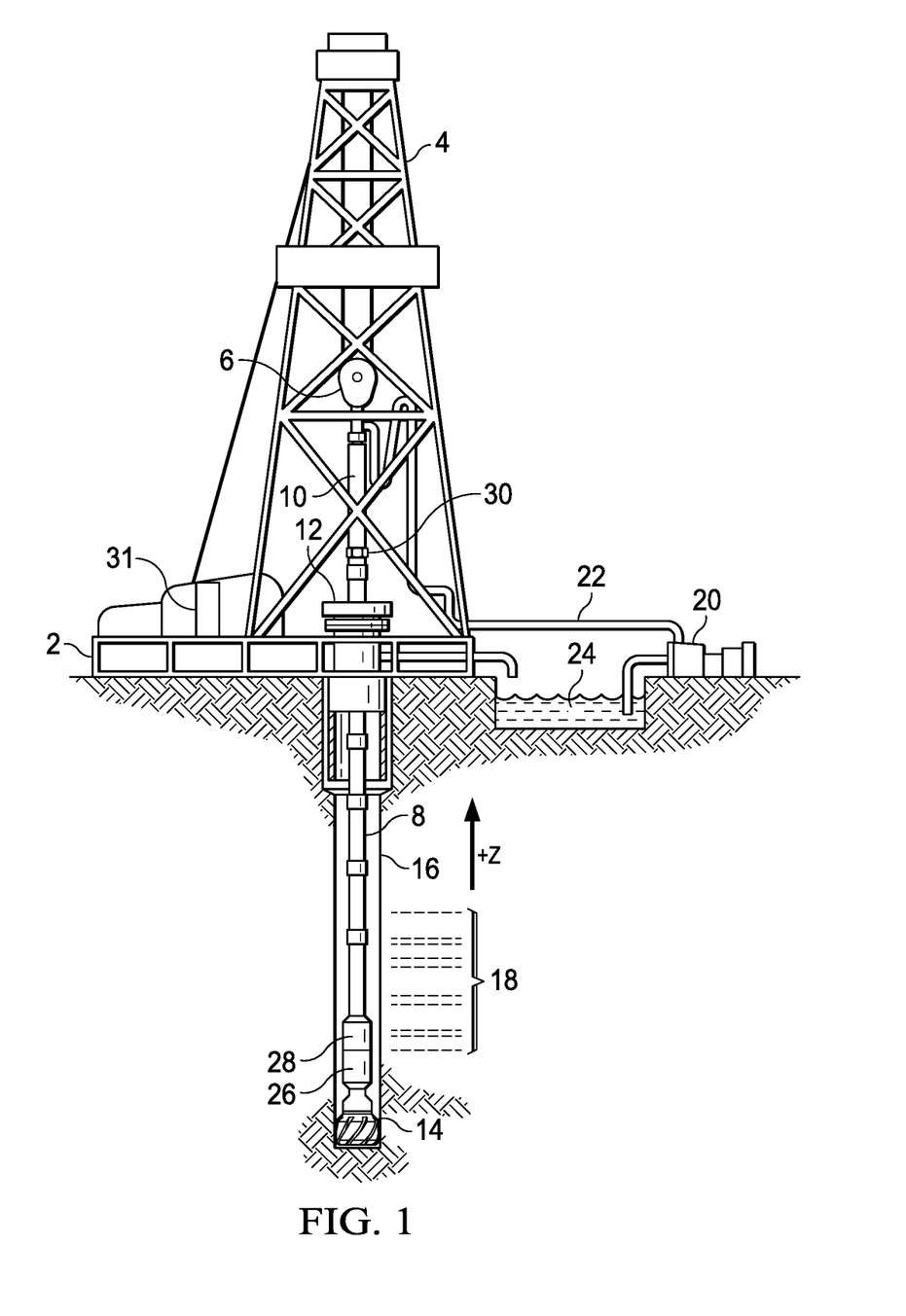
FIG. 1 is a side view of an illustrative logging while drilling (LWD) environment, in accordance with various examples.

FIG. 1 is a side view of an illustrative logging while drilling (LWD) environment, in accordance with various examples. A drilling platform 2 is equipped with a derrick 4 that supports a hoist 6 for raising and lowering a drill string 8. The hoist 6 suspends a top drive 10 suitable for rotating the drill string 8 and lowering the drill string through the well head 12. Connected to the lower end of the drill string 8 is a drill bit 14. As the drill bit 14 rotates, it creates a borehole 16 that passes through various formations 18. A pump 20 circulates drilling fluid through a supply pipe 22 to top drive 10, down through the interior of drill string 8, through orifices in drill bit 14, back to the surface via an annulus around drill string 8, and into a retention pit 24. The drilling fluid transports cuttings from the borehole 16 into the retention pit 24 and aids in maintaining the integrity of the borehole 16. Various materials can be used for drilling fluid, including water-based and oil-based fluids.

An assembly of LWD tools 26 is integrated into the bottom-hole assembly near the drill bit 14. As the drill bit 14 extends the borehole 16 through the formations 18, each logging tool 26 may collect measurements relating to various formation properties, the tool orientation, and/or various other drilling conditions. As illustrated, the assembly of LWD tools 26 may take the form of one or more drill collars, i.e., thick-walled tubulars that provide weight and rigidity to aid the drilling process. (For the present discussion, the assembly of logging tools 26 is expected to include a GRDT, examples of which are described below.) The assembly of logging tools 26 may include a telemetry sub 28 to transfer measurement data to a surface receiver 30 and to receive commands from the surface. In some examples, the telemetry sub 28 does not communicate with the surface, but rather stores logging data for later retrieval at the surface when the assembly of logging tools 26 is recovered.

A computer 31 is coupled to the surface receiver 30 to receive, store, and optionally process and display the measurement data. As discussed further below, computers such as computer 31 include a processor coupled to a memory that stores executable code. The executable code embodies a method which is carried out by the computer when the executable code is executed by the processor. The computer 31 may provide a user interface that enables a user to interact with the executable code, e.g., by viewing and selecting configuration options, viewing results, and optionally repeating the method with different configuration parameters. In at least some examples, the computer 31 operates during the drilling process, enabling a user to analyze measurements in real time and, if desired, to adjust drilling parameters in a timely fashion. Some drillers may rely on logs displayed by the computer to perform geosteering—that is, to steer the borehole 16 relative to a formation bed boundary.

While LWD measurements are desirable because they enable measurements to be acquired while the formations 18 are less affected by fluid invasion, the drilling operations create a high-shock, continuous vibration environment with extended exposure to downhole temperatures and pressures, yielding conditions that are generally hostile to electronic instrumentation, telemetry, and logging tool sensor operations. Consequently, many operators may prefer to conduct at least some of the logging operations with wireline logging tools.

Figure 2:
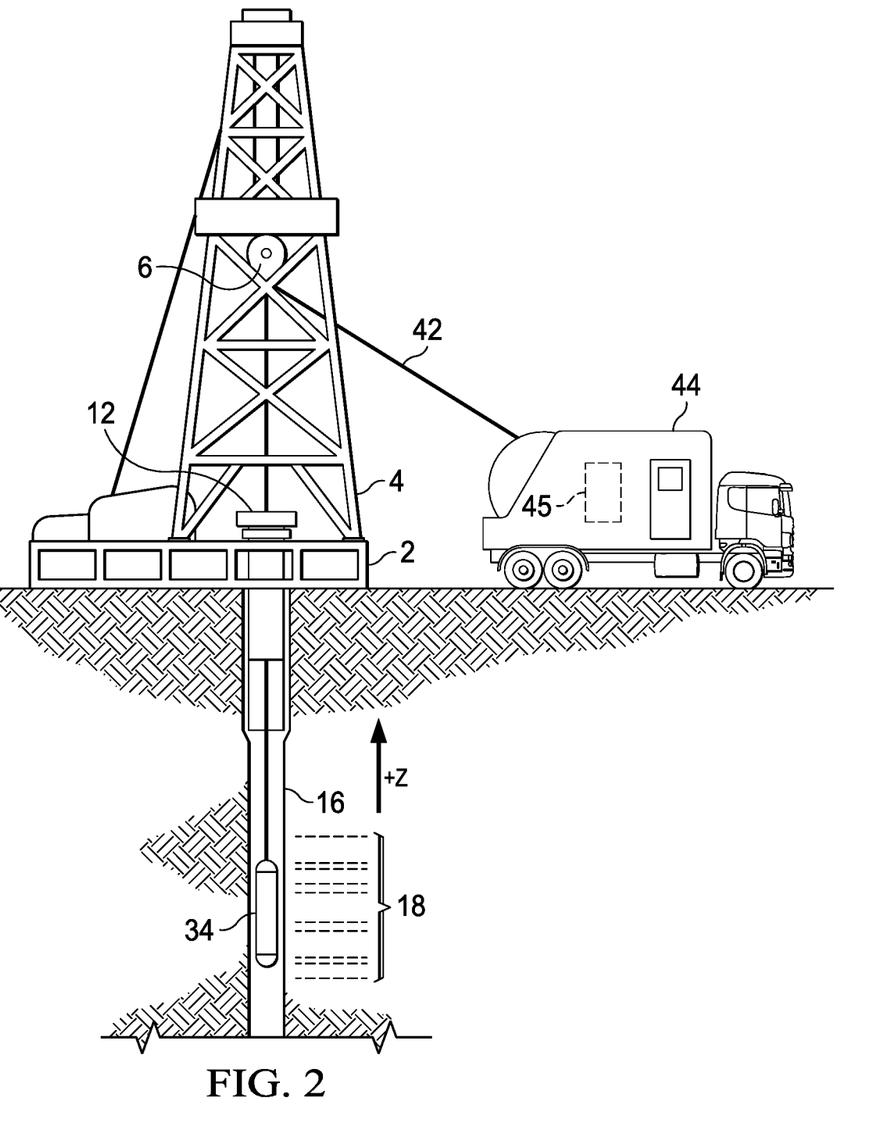
FIG. 2 is a side view of an illustrative wireline logging environment, in accordance with various examples.

FIG. 2 is a side view of an illustrative wireline logging environment, in accordance with various examples. In wireline logging, a sonde (i.e., an assembly of wireline logging tools 34) is lowered into the borehole 16. The assembly of wireline logging tools 34 is suspended at the end of a wireline cable 42 that provides mechanical support to the assembly of wireline logging tools 34 and also provides an electrical connection between the assembly of wireline logging tools 34 and electrical equipment located at the surface, such as a logging facility 44. Wireline cable 42 includes conductors for transporting power to the assembly of wireline logging tools 34 and telemetry from the assembly of wireline logging tools 34 to the logging facility 44. The assembly of wireline logging tools 34 may have pads and/or centralizing springs to maintain the assembly of wireline logging tools 34 near the axis of the borehole 16 as the assembly is pulled toward the surface. For the present discussion, the assembly of wireline logging tools 34 may include a GRDT, examples of which are described below. Logging facility 44 collects measurements from the assembly of wireline logging tools 34, and it includes a computer 45 for processing and storing the measurements gathered by the wireline logging tools. As with computer 31, computer 45 includes a processor coupled to a memory that stores executable code, which may embody one or more of the methods described below.

The scope of this disclosure is not limited to implementation of the disclosed GRDT in measurement-while-drilling (MWD)/LWD and wireline applications. Rather, the disclosed GRDT may be implemented in any of a variety of contexts, including wired drillpipe, wired and unwired coiled tubing, slickline, downhole tractor, and subsea applications. Any and all such applications are contemplated and included within the scope of this disclosure.

Figure 3:
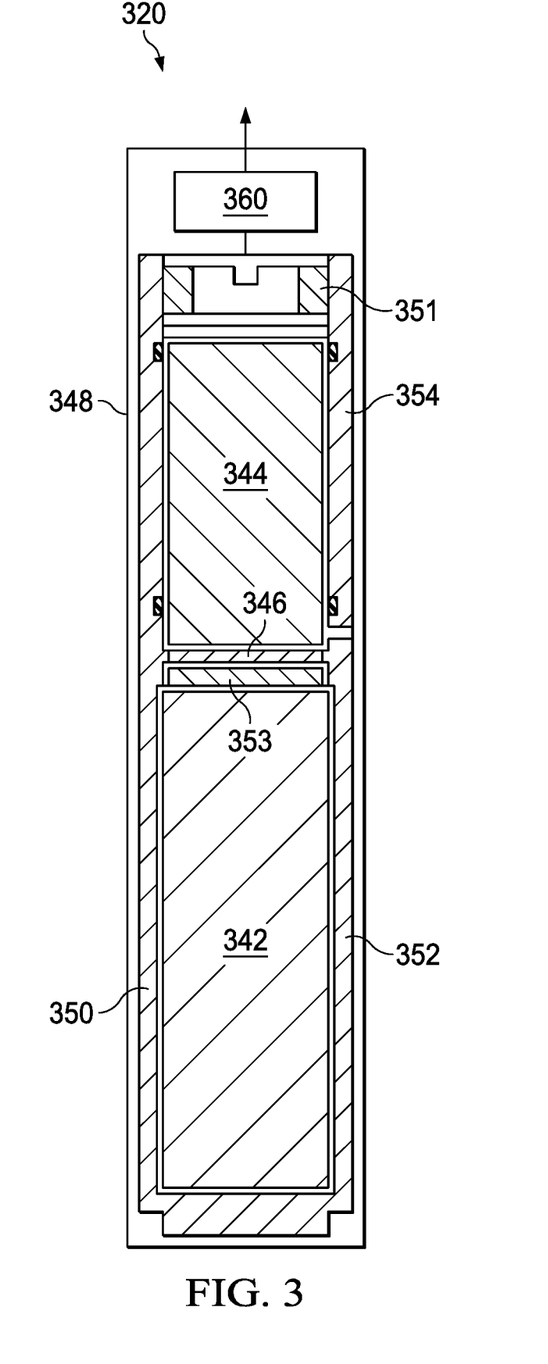
FIG. 3 is a cross-sectional view of a gamma radiation detector tool, in accordance with various examples.

FIG. 3 is a cross-sectional view of a GRDT 320, in accordance with various examples. The GRDT 320 may be included in the assembly of LWD tools 26 and/or the assembly of wireline logging tools 34. The GRDT 320 includes a scintillation crystal 342 that comprises, e.g., a phosphor, such as thallium doped sodium iodide. Scintillation crystal 342 scintillates in response to incident gamma radiation and in response to other mechanical disturbances, such as vibration, friction, etc. Depending on the gamma photon energy, incident radiation can produce scintillations in the phosphor as a result of photoelectric absorption, Compton scattering, or pair production. Scintillation crystal 342 may be formed as a cylindrical member, as a cylindrical geometry facilitates efficient light collection and conversion between scintillation crystal 342 and a photomultiplier tube (PMT) 344. While thallium-doped sodium iodide may be used as an example phosphor for scintillation crystal 342, the present disclosure encompasses any suitable material that reacts in a predictable manner when exposed to incident gamma radiation.

The scintillation crystal 342 and PMT 344 are housed within a shell 348. In some examples, the shell 348 comprises a stainless steel cylindrical member. The shell 348 includes a bore 350, which, in turn, comprises a first portion 352 and a second portion 354. A quartz window 353 seals scintillation crystal 342 within the first portion 352. Scintillation crystal 342 is primarily a sodium iodide salt that is easily damaged if it comes into contact with water or moisture. Moreover, the scintillation crystal 342 includes thallium, a toxic substance. Accordingly, first portion 352 of bore 350 should provide scintillation crystal 342 with a hermetically sealed environment such as that achievable by methods such as electron beam welding. Further, shell 348 should secure scintillation crystal 342 in a manner that minimizes the risk of scintillation crystal 342 shattering or cracking when subjected to shock or vibrations. Bore 350 also includes a second portion 354 for retaining an optical coupler 346 and PMT 344. A locknut 351 may be used to capture optical coupler 346 and PMT 344 in second portion 354 of bore 350.

Optical coupler 346 is a transparent medium that promotes the efficient transfer of light from scintillation crystal 342 to PMT 344. Optical coupler 346 is juxtaposed between PMT 344 and scintillation crystal 342 to eliminate interfacial reflections of light. Preferably, optical coupler 346 is a silicon based plastic or gel. Because optical coupler 346 is preferably contiguous with quartz window 353 and PMT 344, optical coupler 346 can also act as a shock absorption barrier between PMT 344 and scintillation crystal 342. In operation, the PMT 344 converts scintillations from scintillation crystal 342 to countable electrical pulses that can be further processed, such as by a signal processing circuit 360, described below with reference to FIG. 4. The PMT 344 reacts to the scintillation crystal 342 scintillations by producing an electrical signal having an amplitude that is proportional to the intensity of the scintillation.

Figure 4:
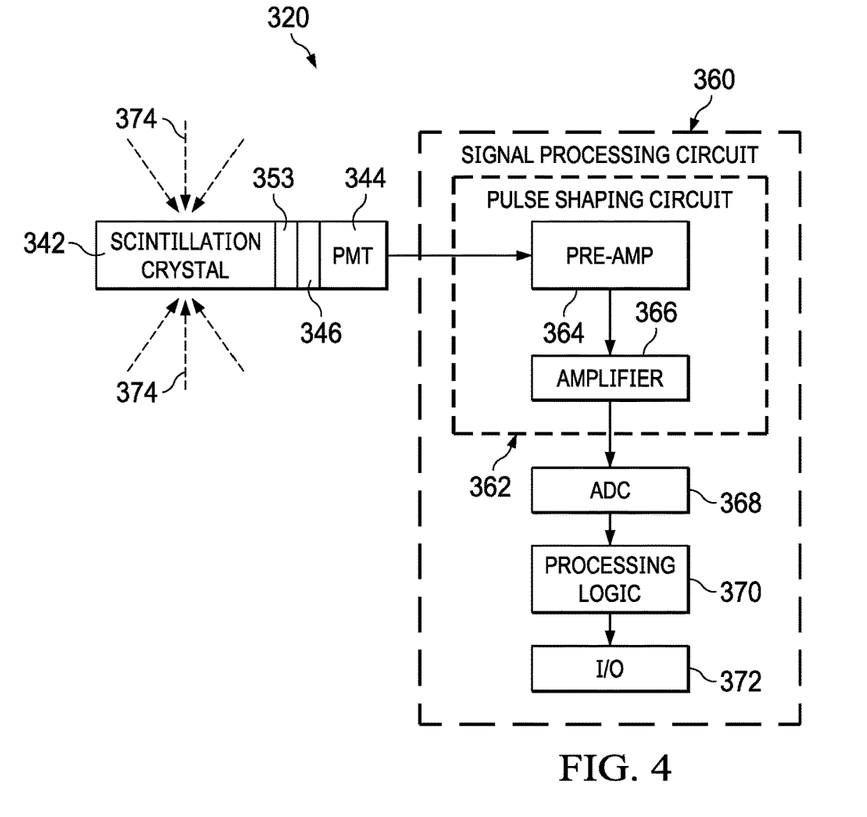
FIG. 4 is a schematic diagram of a gamma radiation detector tool, in accordance with various examples.

FIG. 4 is a schematic diagram of the GRDT 320, in accordance with various examples. The GRDT 320 includes the scintillation crystal 342 in optical communication with the PMT 344 via the quartz window 353 and the optical coupler 346. As explained above, the scintillation crystal 342 provides light pulses to the PMT 344 via the window 353 and the optical coupler 346 in response to gamma radiation 374 and mechanical disturbances. The PMT 344, in turn, outputs electrical signals corresponding to the light pulses received from the scintillation crystal 342. These electrical signals are also in the form of pulses, but the pulses are often irregular in shape with an irregular distribution. Accordingly, the signal processing circuit 360 comprises a pulse shaping circuit 362 that modifies the shapes of the pulses received from the PMT 344. In some examples, the pulse shaping circuit 362 includes a pre-amplifier 364 and an amplifier 366 that are used in tandem to amplify and filter the pulses, thereby producing pulses with a desired shape (for example, Gaussian distributions) with accurate timing information and increased amplitudes. The output of the amplifier 366 couples to an analog-to-digital converter (ADC) 368, which converts the analog output of the amplifier 366 to a digital output—for example, from analog pulses to square wave digital pulses. The output of the ADC 368 is provided to processing logic 370, which performs the functions described below with reference to FIGS. 6-8C. The processing logic 370 provides its output to the input/output (I/O) interface 372, which may, for instance, be an interface to communicate with the telemetry sub 28.

Figure 5:
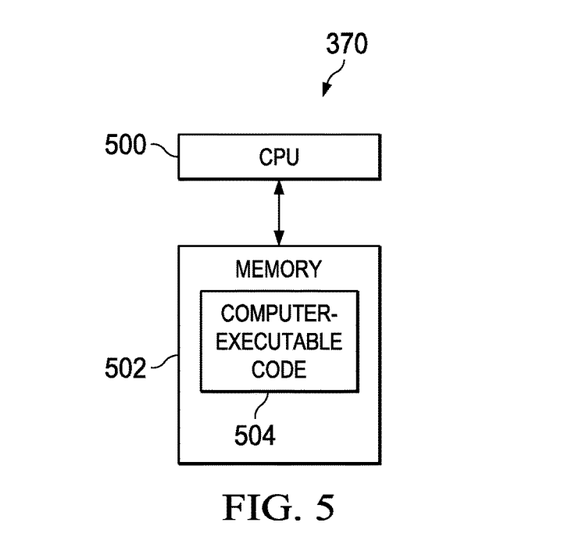
FIG. 5 is a schematic diagram of processing logic, in accordance with various examples.

FIG. 5 is a schematic diagram of the processing logic 370, in accordance with various examples. In some examples, the processing logic 370 comprises a central processing unit ("CPU" or "processor") 500 that couples to memory 502 (e.g., random access memory, read-only memory), as shown in FIG. 5. In at least some such examples, the memory 502 stores computer-executable code 504, which, when executed by the processor 500, causes the processor 500 to perform some or all of the functions described below with reference to FIGS. 6-8C. In some examples, the processing logic 370 comprises a field programmable gate array ("FPGA"), which may be programmed using an appropriate bitstream to cause it to perform some or all of the functions described below with reference to FIGS. 6-8C. In some examples, the processing logic 370 comprises a combination of an FPGA and the components depicted in FIG. 5, with the combination operating in tandem to perform some or all of the functions described below with reference to FIGS. 6-8C. Any and all such combinations are contemplated and included in the scope of this disclosure. In some examples, the processing logic 370 is positioned downhole but external to the GRDT 320, for example, in a different sub. In some examples, the processing logic 370 is positioned at the surface such that pulses from the ADC 368 or other component of the signal processing circuit 360 are communicated to the surface via telemetry and subsequently processed by the processing logic 370.

Figure 6:
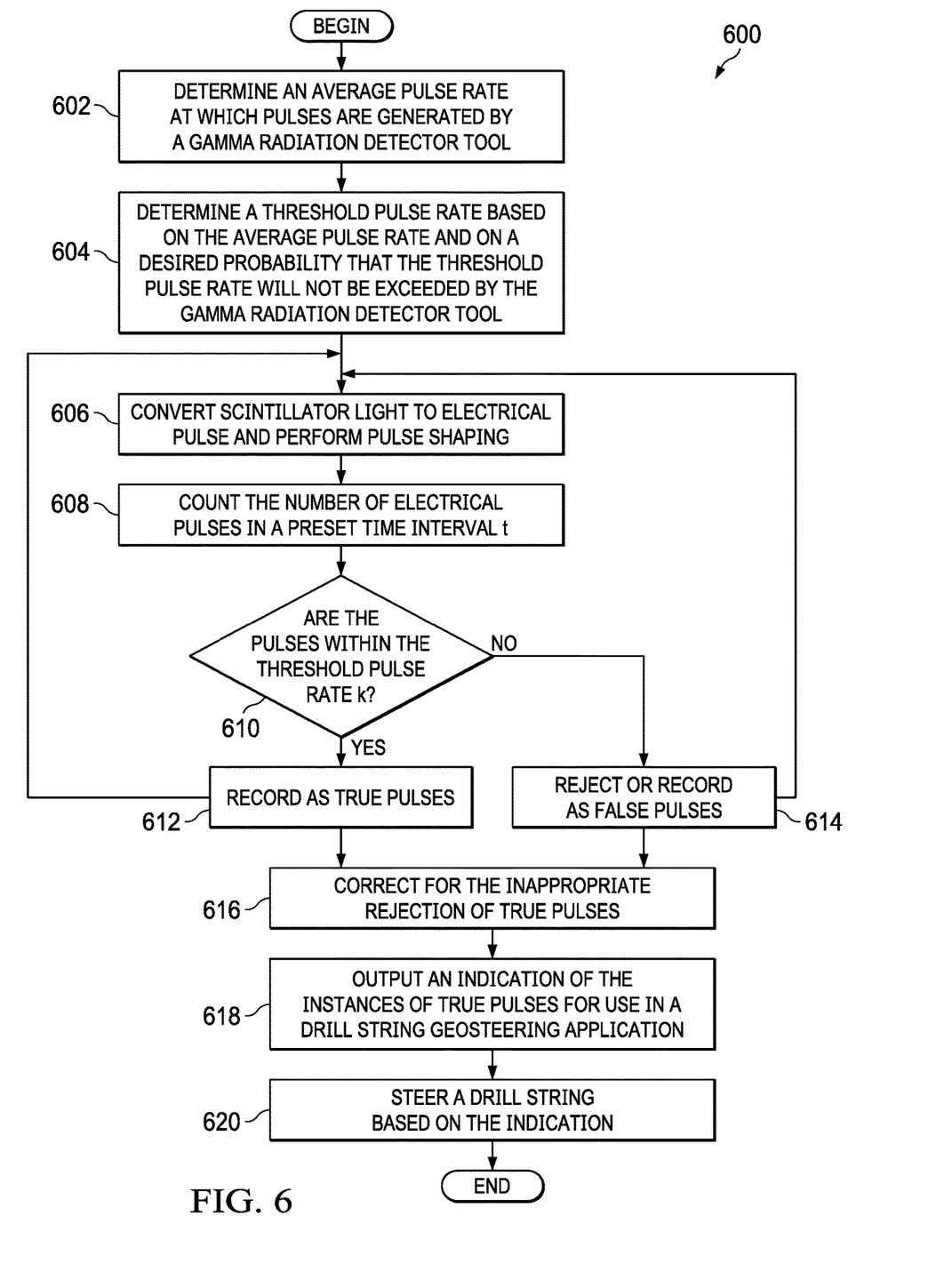
FIG. 6 is a flow diagram of an illustrative method performed in conjunction with a gamma radiation detector tool, in accordance with various examples.

FIG. 6 is a flow diagram of an illustrative method 600 performed in conjunction with the GRDT 320. In some examples, the method 600 is performed by a drilling contractor in the process of drilling a borehole. The method 600 may be performed by one or more other suitable entities as well. At least some of the method 600 may be performed by the GRDT 320 under the control of a suitable entity or entities, such as a drilling contractor. The method 600 begins with determining an average true pulse rate at which pulses are generated by a gamma radiation detector tool (step 602). In some examples, an entity performs this step by operating the GRDT 320 and determining an average true pulse rate over a suitable length of time (e.g., 10 minutes). In some examples, an entity performs this step by obtaining the average true pulse rate in the formation being developed from another source, e.g., previously collected data, another gamma radiation detector tool, etc. In at least some examples, this information is collected during periods of time when mechanical disturbances (e.g., vibrations) are known or believed to be absent or at an acceptably low level (e.g., by the use of sensors in the drill string).

The method 600 next includes determining a threshold pulse rate based on the average true pulse rate and on a desired probability that the threshold pulse rate will not be exceeded by the gamma radiation detector tool (step 604). The threshold pulse rate accounts for both a number of pulses and a specific time interval within which that number of pulses is received. The number of pulses may be any desired value, and the time interval also may be any desired value. In at least some examples, the number of pulses is small (e.g., 1 pulse). In at least some examples, the number of pulses is an integer. In at least some examples, the time interval is relatively short (e.g., one millisecond). In some examples, this step 604 is performed using the Poisson equation, which is expressed as:

$$P(X = k \text{ pulses detected in time interval } t) = e^{-\lambda}\frac{\lambda^k}{k!}$$

where k is a number of true pulses produced by gamma radiation; P is the probability of k true pulses being present in a time interval t; and λ is the average true pulse rate over time interval t. Thus, for instance, assuming that the average pulse rate λ is 0.1 pulses per millisecond, the probability that k=1 true pulses will occur over a time interval t of 1 millisecond is:

$$P(X = 1 \text{ pulses/ms}) = e^{-0.1}\frac{0.1^1}{1!}$$

which results in a probability of 0.09048, or 9.048%. Similarly, the value of k can be used as a threshold and the Poisson equation can be used to determine the probability that the true pulses in a time interval t are less than or equal to the threshold k (which, in this example, is 1):

$$P\left(X = \leq 1\frac{\text{pulses}}{\text{ms}}\right) = \sum_{i=0}^{1} e^{-0.1}\frac{0.1^i}{i!} = 0.9953$$

Thus, given the assumptions above, the probability that 1 or fewer true pulses will be detected over 1 millisecond is 99.53%. The same equation can be used to calculate probabilities for other thresholds k:

$$P\left(X = \leq 2\frac{\text{pulses}}{\text{ms}}\right) = \sum_{i=0}^{2} e^{-0.1}\frac{0.1^i}{i!} = 0.9998$$

$$P\left(X = \leq 3\frac{\text{pulses}}{\text{ms}}\right) = \sum_{i=0}^{3} e^{-0.1}\frac{0.1^i}{i!} = 0.9999$$

In performing step 604, an entity may determine a desired probability (such as the probability values 99.53%, 99.98%, and 99.99% provided above) and select the corresponding value of k as the threshold pulse rate. For a formation in which the average pulse rate A is 0.1 pulses/millisecond, the probabilities associated with threshold pulse rates of 1, 2, and 3 pulses/millisecond do not vary substantially, and so a threshold pulse rate of 1 pulse/millisecond may be used. The scope of this disclosure is not limited to determining a suitable threshold pulse rate using Poisson probability distributions. Other statistical techniques are contemplated and may be included in the scope of this disclosure. In addition, such techniques may be used in the context of any suitable or desired value of k, P, and/or λ.

The method 600 next includes converting light from the scintillation crystal 342 to electrical pulses using the PMT 344 and using the pulse shaping circuit 362 to shape the electrical pulses (e.g., by applying a Gaussian distribution and increasing amplitude as desired, as explained above) (step 606). The method 600 also comprises counting the number of electrical pulses in a preset time interval t (step 608). This step is performed using the processing logic 370 after the pulses output by the pulse shaping circuit 362 have been digitized by the ADC 368. The total number of pulses obtained as a result of performing step 608 may include pulses generated due to gamma radiation, mechanical forces, or a combination thereof.

The pulses from step 608 are compared to the threshold pulse rate k from step 604 (step 610). (The comparison is facilitated by the fact that the pulses determined in step 608 are over a time interval t, which may be the same time interval used as a basis for the threshold pulse rate. In some examples, however, a different time interval is used, and prior to the comparison of step 610, one or both of the values are modified so that they are based on a common time interval.) As explained above, if the pulses from step 608 do not exceed the threshold pulse rate, the probability is very high (99.53%) that the pulses are true pulses, meaning that they are generated in response to gamma radiation and not other (e.g., mechanical) factors. Similarly, if the pulses from step 608 exceed the threshold pulse rate, the probability is very low (0.47%) that the pulses are only true pulses, meaning that the pulses are almost certainly generated at least in part due to factors other than gamma radiation. As a result, pulses not exceeding the threshold pulse rate are recorded (e.g., in a log) as true pulses (step 612), and pulses exceeding the threshold pulse rate are discarded and/or recorded as false pulses (step 614). To "record" a false pulse means to replace the discarded, false pulse value with either a zero value or the threshold value of the threshold pulse rate (e.g., if the threshold pulse rate is 1 pulse/millisecond, the value "1" may be used to replace the discarded value).

Figure 8A:
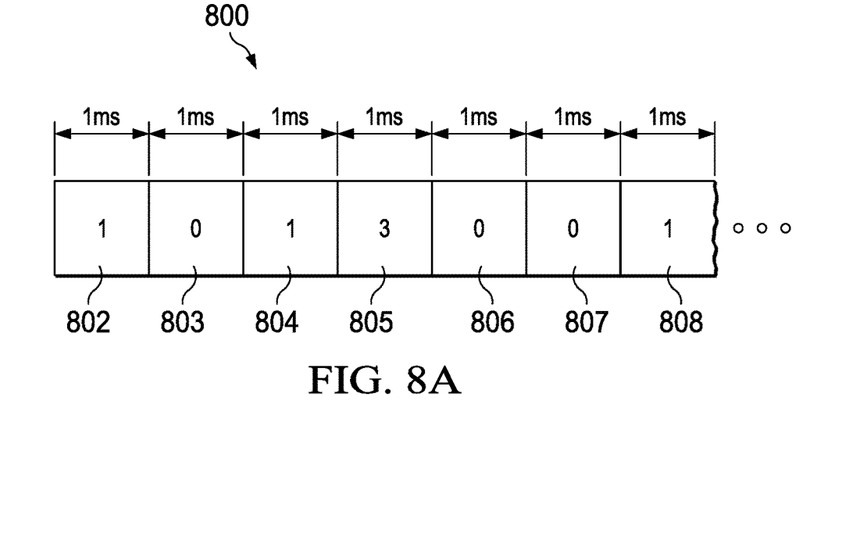
FIG. 8A is a schematic diagram depicting a log in which multiple detected pulses are recorded, in accordance with various examples.
Figure 8B:
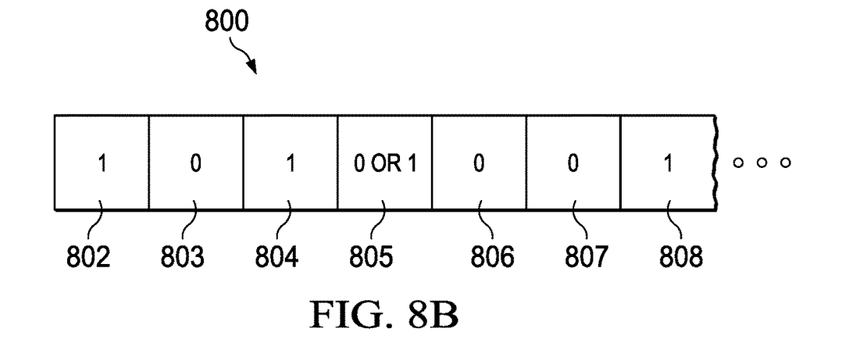
FIG. 8B is a schematic diagram depicting a log in which false pulses are recorded, in accordance with various examples.

FIGS. 8A and 8B are conceptual diagrams of a log 800 illustrating the recording of true and false pulses. In FIG. 8A, the log 800 depicts entries 802-808, each of which corresponds to an instance of pulses received during a 1 millisecond time frame. In entry 802, an instance of 1 pulse is received and recorded. Because 1 is less than or equal to an illustrative threshold of 1 pulse per millisecond, the value in entry 802 is not altered, as FIG. 8B depicts. In entry 803, an instance of 0 pulses is received and recorded. Because 0 is less than or equal to the threshold of 1 pulse per millisecond, the value in entry 803 is not altered, as FIG. 8B depicts. In entry 804, an instance of 1 pulse is received and recorded. Because 1 is less than or equal to an illustrative threshold of 1 pulse per millisecond, the value in entry 804 is not altered, as FIG. 8B depicts. In entry 805, an instance of 3 pulses is received and recorded. Because 3 is greater than the threshold of 1 pulse per millisecond, the value in entry 805 is altered, as FIG. 8B depicts. Specifically, as FIGS. 8A and 8B illustrate, the value of 3 in entry 805 is discarded. Furthermore, a value of 0 is recorded in entry 805, or, alternatively, a value corresponding to the threshold (in this example, a value of 1) is recorded in entry 805. Because the remaining entries 806-808 in FIG. 8A indicate instance of pulses that are less than or equal to the threshold, the values in those entries are not altered, as FIG. 8B depicts.

Figure 8C:
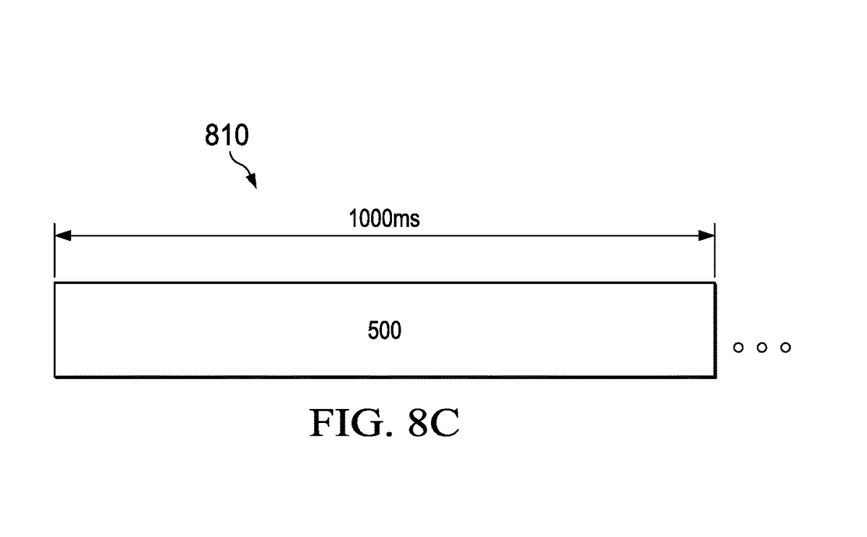
FIG. 8C is a schematic diagram depicting corrected, aggregated pulses, in accordance with various examples.

Referring again to FIG. 6, after step 612 or step 614 is performed, the method 600 proceeds to step 606. In this manner, steps 606, 608, 610, 612, and/or 614 may be performed iteratively as long as may be desired or appropriate. Either concurrently with the iterative performance of steps 606, 608, 610, 612, and/or 614, or after the iterative performance of steps 606, 608, 610, 612, and/or 614, the method 600 comprises performing steps 616, 618, and 620. Step 616 comprises correcting the pulses to account for the rejection of true pulses. Stated another way, when an instance of pulse(s) is rejected or recorded as containing false pulses (step 614 and FIGS. 8A-8B), it is also possible that that instance of pulse(s) contained one or more true pulses. Thus, it may be useful to correct for this inappropriate rejection of true pulses (or recordation of true pulses as false pulses). In some examples, the correction of step 616 is performed by first aggregating the pulses in a specific time period (e.g., 1000 milliseconds or 1 second) and dividing the total pulses in that time period by the decimal form of the probability associated with the threshold pulse rate. In the foregoing example, the probability associated with the threshold pulse rate of 1 pulse per millisecond is 99.53%, so the aggregated pulse may be divided by 0.9953 to produce a corrected pulse. FIG. 8C depicts an example corrected aggregate of pulses 810, which indicates a total of 500 true pulses over the span of 1000 milliseconds. The 500 true pulses are calculated as described above. The scope of this disclosure is not limited to any particular technique of correcting for inappropriate rejections of true pulses, and other techniques are contemplated and included within the scope of this disclosure.

Step 618 comprises providing an indication of the instances of true pulses for use in a drill string geosteering application. An indication may include, for example, the corrected aggregate pulse described above. The indication may have any suitable time basis (e.g., per second). The indication may be in the form of a digital code, for example. The indication may be communicated to the surface using any suitable telemetry technique and provided, e.g., on a computer display, such as a display of the computer 31. In other examples, the indication is communicated to the surface and is provided for output on any of a variety of output devices, such as a mobile phone display, a printer, a speaker, etc. Step 620 includes steering a drill string based on the indication. Because the steering of a drill string affects the creation of a borehole, it constitutes a practical application of the indication produced in step 618. This illustrative, practical application of the indication produced in step 618 has technical advantages. For instance, the indication can be used to more accurately determine specific properties of the formation surrounding the GRDT, and these properties can be considered when determining the trajectory of the borehole.

Figure 7:
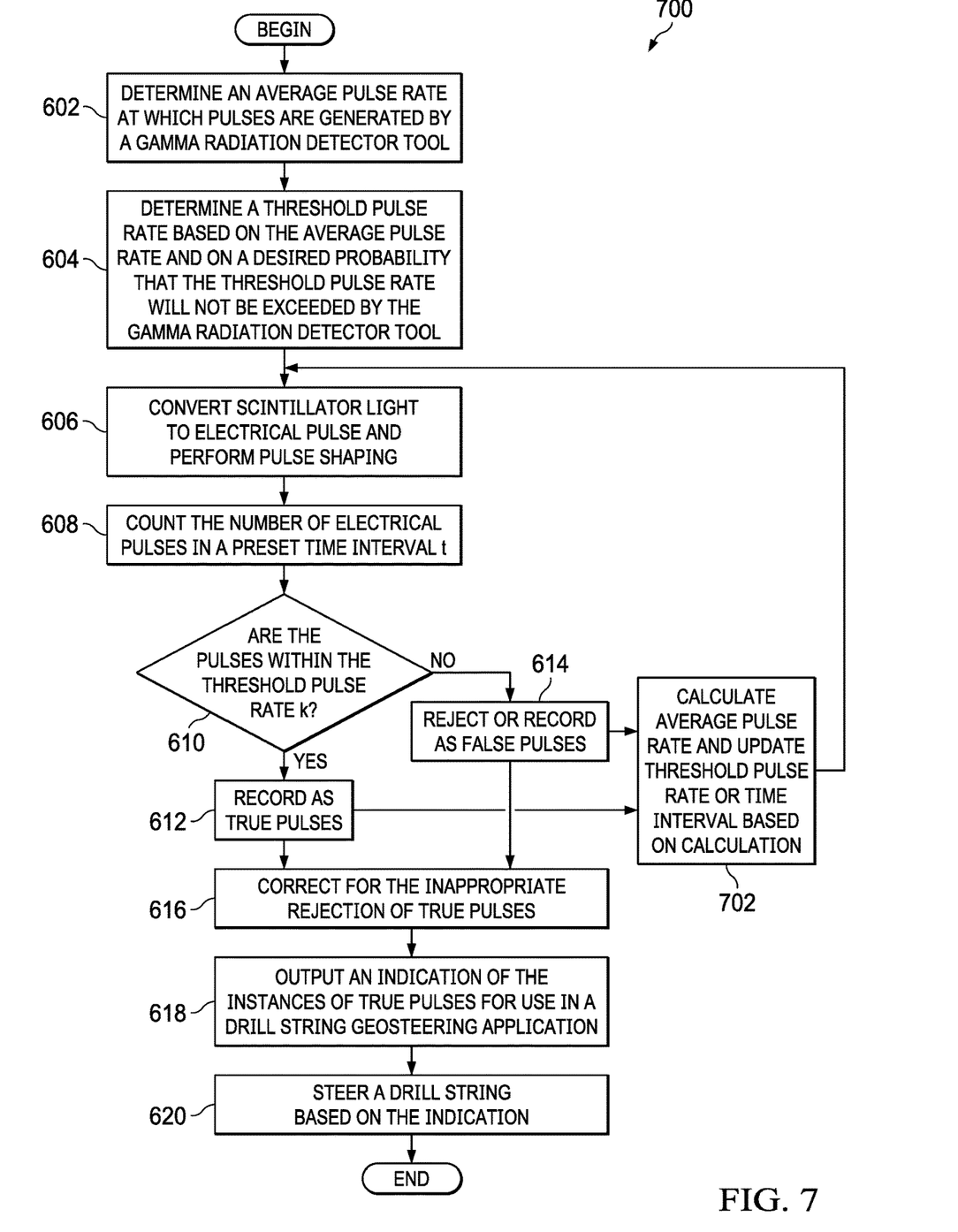
FIG. 7 is a flow diagram of an illustrative method performed in conjunction with the gamma radiation detector tool, in accordance with various examples.

FIG. 7 is a flow diagram of an illustrative method 700 performed in conjunction with the GRDT 320. In some examples, the method 700 is performed by a drilling contractor in the process of drilling a borehole. The method 700 may be performed by one or more other suitable entities as well. At least some of the method 700 may be performed by the GRDT 320 under the control of a suitable entity or entities, such as a drilling contractor. All steps of the method 700 are similar to the corresponding steps of the method 600. However, method 700 additionally includes a step 702, which comprises calculating an average pulse rate and using the calculation to update the threshold pulse rate or the time interval being used in the method 700. In examples, step 702 is performed after step 612 or step 614, as shown. The average pulse rate may be calculated over any suitable period of time—for example, the true pulses over the preceding 10 milliseconds, 100 milliseconds, 1000 milliseconds, 10 seconds, 1 minute, 10 minutes, etc. may be used to determine the average pulse rate over that period of time. Once the average pulse rate has been determined, it may be used to update the threshold pulse rate. Updating the threshold pulse rate may be useful when the true pulse rate is significantly higher or lower than expected, or when the sampling frequency of the ADC 368 (FIG. 4) is significantly higher or lower than expected. The threshold pulse rate may be updated, e.g., by using the average pulse rate and the Poisson equation, as described above. In such a calculation, the time interval remains unchanged from that used in step 604. If the threshold pulse rate is updated, it may be used in lieu of the outdated threshold pulse rate to perform corrections in step 616.

Alternatively, the step 702 comprises calculating the average pulse rate and using the average pulse rate to update the time interval being used in the method 600. It may be useful to update the time interval when, for example, the true pulse rate is lower or higher than expected, or when the sampling frequency of the ADC 368 (FIG. 4) is significantly higher or lower than expected. The time interval may be shortened or lengthened such that a desired threshold pulse rate (e.g., 1 pulse per unit time) is achieved. For example, if the previous threshold pulse rate is 1 pulse per millisecond, but the average pulse rate calculated in step 702 is 0.1 pulses per millisecond, then the time interval may be too short and may be extended. Accordingly, in step 702, the time interval may be extended such that the threshold pulse rate is 1 pulse per 10 milliseconds, which would more closely resemble the average pulse rate of 0.1 pulses per millisecond, i.e., 1 pulse per 10 milliseconds.

Because the threshold pulse rate and time interval adjustments of step 702 are performed during the iterative process of steps 606, 608, 610, 612, and 614, the threshold pulse rate and time interval may be said to be determined dynamically. Methods 600 and 700 may be modified as desired, including by adding, deleting, modifying, or rearranging one or more steps.

In the foregoing discussion and in the claims, the terms "including" and "comprising" are used in an open-ended fashion, and thus should be interpreted to mean "including, but not limited to . . . ." Unless otherwise stated, "about," "approximately," or "substantially" preceding a value means +/−10 percent of the stated value. The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

In some examples, a computer-readable medium stores executable code which, when executed by a processor, causes the processor to obtain a threshold pulse rate that is based on an average pulse rate of a gamma radiation detector tool and on a desired probability that the threshold pulse rate will not be exceeded by the gamma radiation detector tool. The code also causes the processor to identify instances of pulse from the gamma radiation detector tool that do not exceed the threshold pulse rate, and output an indication of the identified instances of pulses for use in a measurement-while-drilling application. Such a computer-readable medium may be supplemented using one or more of the following concepts, in any order and in any combination: wherein the executable code causes the processor to determine the threshold pulse rate using a Poisson equation; wherein the average pulse rate is defined per millisecond; wherein the executable code causes the processor to identify and discard an instance of pulses from the gamma radiation detector tool that exceeds the threshold pulse rate; wherein the executable code causes the processor to replace the discarded instance of pulses with a zero pulse value; wherein the executable code causes the processor to replace the discarded instance of pulses with a value that is based on the threshold pulse rate; wherein the executable code causes the processor to correct the indication for erroneously discarded instances of pulses; wherein the indication comprises an aggregate of the identified instances of pulses, and wherein the executable code causes the processor to divide the aggregate by the desired probability; wherein the threshold pulse rate is equivalent to one pulse per millisecond; wherein the executable code causes the processor to dynamically change the threshold pulse rate based on the average pulse rate; and wherein the executable code causes the processor to dynamically change a time interval associated with both the average pulse rate and the threshold pulse rate in response to a change in the average pulse rate.

In some examples, a system comprises a scintillation crystal; a photomultiplier tube (PMT) in optical communication with the scintillation crystal; amplifier circuitry coupled to the PMT; an analog-to-digital converter (ADC) coupled to the amplifier circuitry; and a processor coupled to the ADC. The system also includes a computer-readable medium coupled to the processor and storing executable code, which, when executed by the processor, causes the processor to: quantify an instance of electrical pulses received from the ADC within a time interval, the electrical pulses corresponding to light pulses output by the scintillation crystal; in response to the instance of electrical pulses exceeding a threshold pulse rate, identify the instance of electrical pulses as an instance of false pulses; in response to the instance of electrical pulses not exceeding the threshold pulse rate, identify the instance of electrical pulses as an instance of true pulses; and output an indication of the instance of true pulses for use in a measurement-while-drilling application. Such a system may be supplemented using one or more of the following concepts, in any order and in any combination: wherein the executable code causes the processor to determine the threshold pulse rate using the Poisson equation and based on an average pulse rate associated with the system and based on a desired probability that the threshold pulse rate will not be exceeded by the system; wherein the executable code causes the processor to divide the indication by the desired probability; wherein the executable code causes the processor to dynamically change the threshold pulse rate in response to a change in the average pulse rate; wherein the executable code causes the processor to dynamically change a time interval associated with both the average pulse rate and the threshold pulse rate in response to a change in the average pulse rate; and wherein the executable code causes the processor to discard the instance of false pulses and to replace the discarded instance of false pulses with a zero value.

In some examples, a method comprises positioning a gamma radiation detector tool within a borehole; determining an average pulse rate at which pulses are generated by the gamma radiation detector tool; using the Poisson equation to determine a threshold pulse rate based on the average pulse rate and on a desired probability that the threshold pulse rate will not be exceeded by the gamma radiation detector tool; identifying instances of pulses from the gamma radiation detector tool that do not exceed the threshold pulse rate; providing an indication of the identified instances of pulses; and steering a drill string based on the indication, the drill string housing the gamma radiation detector tool. Such a method may be supplemented using one or more of the following concepts, in any order and in any combination: wherein the threshold pulse rate is one pulse per millisecond; and wherein the indication comprises an aggregate of the identified instances of pulses, and further comprising dividing the indication by the desired probability.

What is claimed is:

1. A non-transitory computer-readable medium storing executable code which, when executed by a processor, causes the processor to:
   obtain a threshold pulse rate that is based on an average pulse rate of a gamma radiation detector tool and on a predetermined probability that the threshold pulse rate will not be exceeded by the gamma radiation detector tool;
   identify instances of pulse from the gamma radiation detector tool that do not exceed the threshold pulse rate; and
   output an indication of the identified instances of pulses for use in a measurement-while-drilling application.

2. The non-transitory computer-readable medium of claim 1, wherein the executable code causes the processor to determine the threshold pulse rate using a Poisson equation.

3. The non-transitory computer-readable medium of claim 2, wherein the average pulse rate is defined per millisecond.

4. The non-transitory computer-readable medium of claim 1, wherein the executable code causes the processor to identify and discard an instance of pulses from the gamma radiation detector tool that exceeds the threshold pulse rate.

5. The non-transitory computer-readable medium of claim 4, wherein the executable code causes the processor to replace the discarded instance of pulses with a zero pulse value.

6. The non-transitory computer-readable medium of claim 4, wherein the executable code causes the processor to replace the discarded instance of pulses with a value that is based on the threshold pulse rate.

7. The non-transitory computer-readable medium of claim 4, wherein the executable code causes the processor to correct the indication for erroneously discarded instances of pulses.

8. The non-transitory computer-readable medium of claim 7, wherein the indication comprises an aggregate of the identified instances of pulses, and wherein the executable code causes the processor to divide the aggregate by the predetermined probability.

9. The non-transitory computer-readable medium of claim 1, wherein the threshold pulse rate is equivalent to one pulse per millisecond.

10. The non-transitory computer-readable medium of claim 1, wherein the executable code causes the processor to dynamically change the threshold pulse rate based on the average pulse rate.

11. The non-transitory computer-readable medium of claim 1, wherein the executable code causes the processor to dynamically change a time interval associated with both the average pulse rate and the threshold pulse rate based on the average pulse rate.

12. A system, comprising:
   a scintillation crystal;
   a photomultiplier tube (PMT) in optical communication with the scintillation crystal;
   amplifier circuitry coupled to the PMT;
   an analog-to-digital converter (ADC) coupled to the amplifier circuitry;
   a processor coupled to the ADC; and
   a non-transitory computer-readable medium coupled to the processor and storing executable code, which, when executed by the processor, causes the processor to:
   quantify an instance of electrical pulses received from the ADC within a time interval, the electrical pulses corresponding to light pulses output by the scintillation crystal;
   in response to the instance of electrical pulses exceeding a threshold pulse rate that is based on an average pulse rate associated with the system and on a predetermined probability that the threshold pulse rate will not be exceeded by the system, identify the instance of electrical pulses as an instance of false pulses;
   in response to the instance of pulses not exceeding the threshold pulse rate, identify the instance of electrical pulses as an instance of true pulses; and
   output an indication of the instance of true pulses for use in a measurement-while-drilling application.

13. The system of claim 12, wherein the executable code causes the processor to determine the threshold pulse rate using the Poisson equation.

14. The system of claim 12, wherein the executable code causes the processor to divide the indication by the predetermined probability.

15. The system of claim 12, wherein the executable code causes the processor to dynamically change the threshold pulse rate in response to a change in the average pulse rate.

16. The system of claim 12, wherein the executable code causes the processor to dynamically change a time interval associated with both the average pulse rate and the threshold pulse rate in response to a change in the average pulse rate.

17. The system of claim 12, wherein the executable code causes the processor to discard the instance of false pulses and to replace the discarded instance of false pulses with a zero value.

18. A method, comprising:
   positioning a gamma radiation detector tool within a borehole;
   determining an average pulse rate at which pulses are generated by the gamma radiation detector tool;
   using the Poisson equation to determine a threshold pulse rate based on the average pulse rate and on a predetermined probability that the threshold pulse rate will not be exceeded by the gamma radiation detector tool;
   identifying instances of pulses from the gamma radiation detector tool that do not exceed the threshold pulse rate;
   providing an indication of the identified instances of pulses; and
   steering a drill string based on the indication, the drill string housing the gamma radiation detector tool.

19. The method of claim 18, wherein the threshold pulse rate is one pulse per millisecond.

20. The method of claim 18, wherein the indication comprises an aggregate of the identified instances of pulses, and further comprising dividing the indication by the predetermined probability.

* * * * *